US008737284B2

(12) United States Patent
Ninagawa

(10) Patent No.: US 8,737,284 B2
(45) Date of Patent: May 27, 2014

(54) RELAY STATION AND RADIO COMMUNICATION RELAY METHOD

(75) Inventor: Takayasu Ninagawa, Gifu (JP)

(73) Assignee: KYOCERA Corporation, Kyoto (JP)

( * ) Notice: Subject to any disclaimer, the term of this patent is extended or adjusted under 35 U.S.C. 154(b) by 314 days.

(21) Appl. No.: 13/060,271

(22) PCT Filed: Aug. 21, 2009

(86) PCT No.: PCT/JP2009/064679
§ 371 (c)(1),
(2), (4) Date: Feb. 22, 2011

(87) PCT Pub. No.: WO2010/024207
PCT Pub. Date: Mar. 4, 2010

(65) Prior Publication Data
US 2011/0158157 A1      Jun. 30, 2011

(30) Foreign Application Priority Data

Aug. 23, 2008   (JP) .................................. 2008-214723

(51) Int. Cl.
*H04B 7/14* (2006.01)
(52) U.S. Cl.
USPC ............................ 370/315; 370/352; 455/515
(58) Field of Classification Search
USPC ................. 370/315–327, 353–356, 331–338, 370/349–350, 390–427; 455/7, 422.1, 515
See application file for complete search history.

(56) References Cited

U.S. PATENT DOCUMENTS

2004/0254980 A1* 12/2004 Motegi et al. ................. 709/203
2006/0046643 A1   3/2006 Izumikawa et al.
2008/0031174 A1*  2/2008 Saifullah et al. .............. 370/311
2008/0107073 A1*  5/2008 Hart et al. ..................... 370/330
2010/0075693 A1   3/2010 Kishigami et al.

FOREIGN PATENT DOCUMENTS

| JP | 2001-285186 A | 10/2001 |
| JP | 2002-057618 A | 2/2002 |
| JP | 2006-074325 A | 3/2006 |
| JP | 2008-136201 A | 6/2008 |
| JP | 2008-193666 A | 8/2008 |

OTHER PUBLICATIONS

Japanese Office Action "Notification of Reasons for Refusal" dated Sep. 4, 2012, which corresponds to Japanese Patent Application No. 2008-214723 and is related to U.S. Appl. No. 13/060,271; with translation.
WiMAX Forum; "Mobile WiMAX—Part 1: A Technical Overview and Performance Evaluation" Feb. 21, 2006.

* cited by examiner

*Primary Examiner* — Ricky Ngo
*Assistant Examiner* — Iqbal Zaidi
(74) *Attorney, Agent, or Firm* — Studebaker & Brackett PC

(57) ABSTRACT

A relay station 130 includes a base station communication unit 350 which performs radio communication with a radio communication terminal, a terminal communication unit 354 which performs radio communication with the base station 120, a command transmission unit 356, 556 which transmits a command to alternate communication and non-communication per a predetermined number of frames to the base station through the terminal communication unit; and a communication switching unit 358, 558 which makes the base station communication unit and the radio communication terminal be in communication while the terminal communication unit and the base station are in non-communication based on the command, and making the base station communication unit and the radio communication terminal while the terminal communication unit and the base station are in communication based on the command.

3 Claims, 9 Drawing Sheets

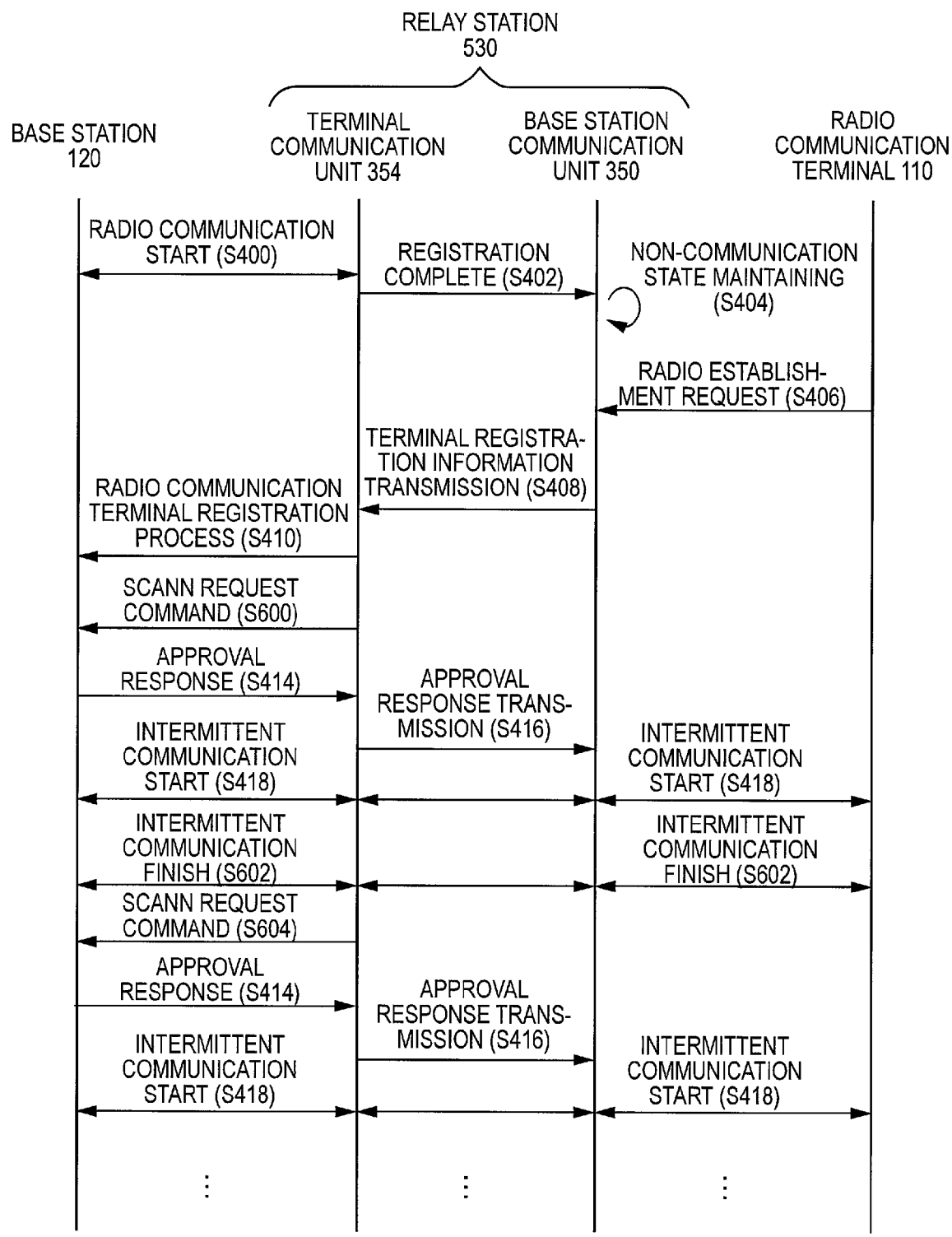

RELAY STATION AND RADIO COMMUNICATION RELAY METHOD

TECHNICAL FIELD

The present invention relates to a relay station capable of relaying radio communication between a radio communication terminal and a base station, and a radio communication relay method.

BACKGROUND ART

In recent years, radio communication terminals such as PHSs (Personal Handy phone System), portable telephones, and the like have been widely available, and it has been possible to make calls or obtain information anywhere and anytime. In particular, lately, as an amount of available information has shown steady growth, high speed and high quality radio communication systems have been introduced to download a large amount of data.

As one of the high-speed digital radio communication systems, there is an OFDMA (Orthogonal Frequency Division Multiplex Access) system such as IEEE802.11 or WiMAX (e.g., "Mobile WiMAX-Part I: A Technical Overview and Performance Evaluation" prepared on Behalf of the WiMAX Forum, Feb. 21, 2006). The OFDMA system is one of data multiplexing systems, which effectively uses a frequency band by using a plurality of carriers on a unit time axis and making phases of signal waves orthogonal between adjacent carriers to partially overlap bands of the carriers. In addition, compared to an OFDM (Orthogonal Frequency Division Multiplexing) system, which assigns sub-channels in time division to individual users, the OFDMA system allows a plurality of users to share all sub-channels and assigns sub-channels having the highest transmission efficiency to each user.

If the above-described next-generation high-speed radio communication method, such as WiMAX, uses high frequency range of 2.5 GHz or higher, communication coverage for one base station is reduced in an area where the radio wave state is poor due to many obstacles or other causes. Thus, in order to cover all environments, a plurality of base stations need to be installed. In addition, since detouring of radio waves is suppressed, it is highly likely that the inside of a building is out of the communication coverage.

Accordingly, the technology for reducing a range of a service area, where communication with a base station is not available due to an effect of shadowing, which occurs from hiding by obstacles such as a building, or other causes, by installing a relay device for relaying the base station and a radio terminal device is disclosed (e.g., Japanese Patent Application Publication No. 2006-74325). In addition, the technology, in which a relay station effectively controls the time of transition from reception to transmission by defining a plurality of transmission windows in a transmission frequency band, is disclosed (e.g., Japanese Patent Application Publication No. 2008-136201).

The relay station is installed and fixed in a building or a tower, and furthermore, may be installed in moving objects, into which a person can take, such as buses or subways. The relay station installed in a moving object is capable of maintaining the relative position relationship to a radio communication terminal, so that stable communication of the radio communication terminal can be secured.

SUMMARY OF THE INVENTION

Problems to be Solved by the Invention

The relay station functions as a radio communication terminal for communication with a base station and functions as a base station for communication with a radio communication terminal, so that real-time transmission of communication data is realized. In other words, when a terminal communication unit of the relay station performing communication with a radio communication terminal is receiving communication data (downlinks) from a base station, a base station communication unit of the relay station performing communication with the base station transmits communication data (downlinks) to the radio communication terminal at the same timing. Likewise, when the base station communication unit is receiving communication data (uplinks) from the radio communication terminal, the terminal communication unit transmits communication data (uplinks) to the base station.

In general, since the relay station is housed in an integratedly formed housing, in most cases, the terminal communication unit and the base station communication unit described above are not spaced with a sufficient distance. Under this circumstance, if a frequency band used in communication with the base station is close to a frequency band used in communication with the radio communication terminal, leakage power of transmission data in a transmitting side comes into a receiving side thereby causing interference with reception data. As a result, there is a possibility that the receiver cannot properly receive the reception data.

The present invention has been made in consideration of this problem, and an object is to provide a relay station and a radio communication relay method, in which a relay station subjectively controls communication with a base station or a radio communication terminal, thereby avoiding interference in the relay station, so that it is possible to perform stable radio communication.

Means for Solving the Problems

A relay station according to an embodiment of the present invention is capable of relaying radio communication between a radio communication terminal and a base station, and includes: a base station communication unit which performs radio communication with one or more radio communication terminals; a terminal communication unit which performs radio communication with the base station; a command transmission unit which transmits a command to the base station though the terminal communication unit, the command instructing the base station to alternate communication and non-communication per a predetermined number of frames; and a communication switching unit which makes the base station communication unit and the radio communication terminal be in communication while the terminal communication unit and the base station are in non-communication based on the command, and makes the base station communication unit and the radio communication terminal be in non-communication while the terminal communication unit and the base station are in communication based on the command.

A radio communication relay method according to an embodiment of the present invention is for relaying radio communication between a radio communication terminal and a base station, and includes: performing radio communication with one or more radio communication terminals by a base station communication unit; performing radio communication with the base station by a terminal communication unit; transmitting a command to the base station, the command instructing the base station to alternate communication and non-communication per a predetermined number of frames; and making the base station communication unit and the radio communication terminal be in communication while the terminal communication unit and the base station are in non-communication based on the command, and making the base station communication unit and the radio communication terminal be in non-communication while the terminal communication unit and the base station are in communication based on the command.

Effect of the Invention

As described above, according to an embodiment of the present invention, a relay station subjectively controls communication with a base station or a radio communication terminal, thereby avoiding interference in the relay station, so that it is possible to perform stable radio communication.

BRIEF DESCRIPTION OF THE DRAWINGS

FIG. 12 is a sequence view showing detailed processes of a radio communication relay method according to the second embodiment.

DESCRIPTION OF EMBODIMENTS

Figure 1:
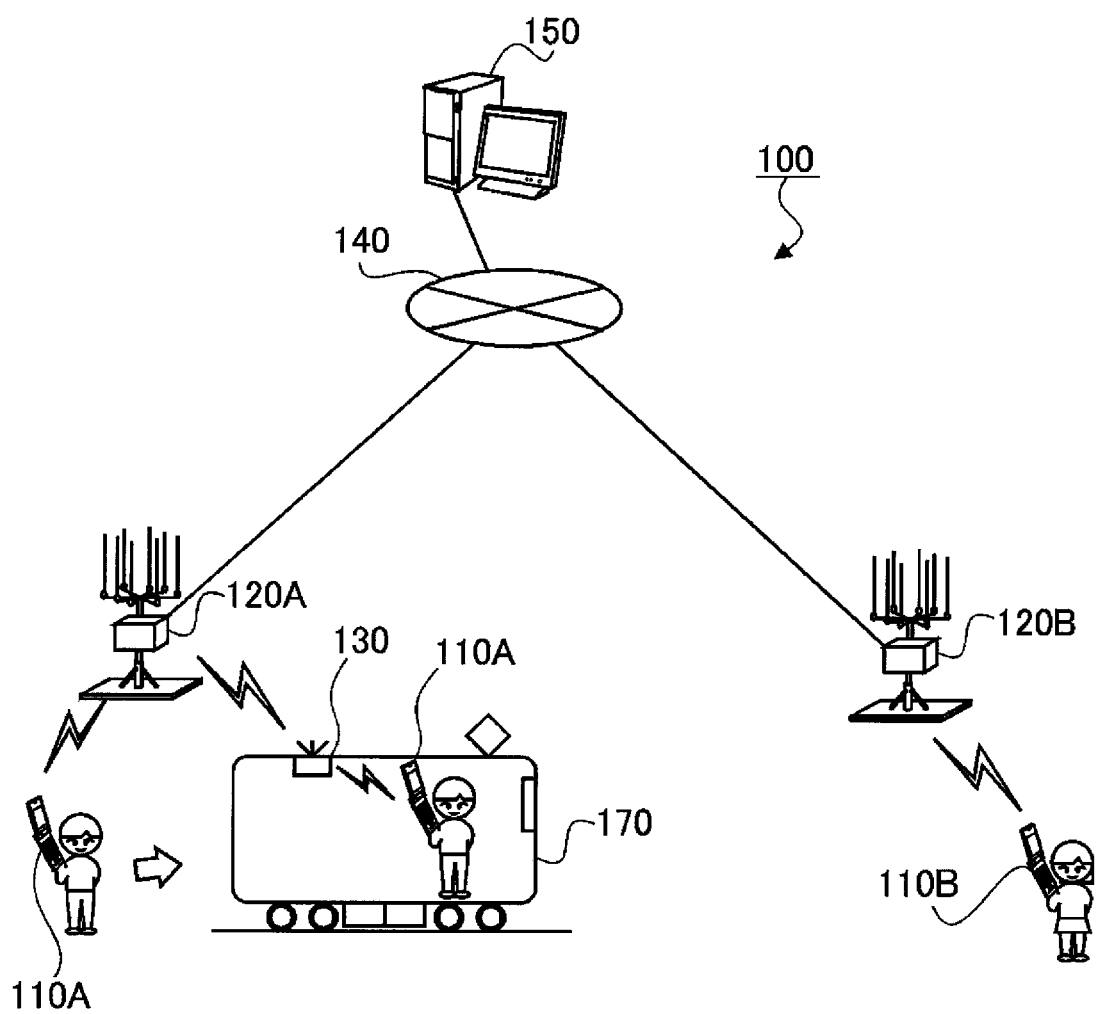
FIG. 1 is a block diagram showing general configuration of a radio communication system according to a first embodiment.

Hereinafter, a preferable embodiment of the present invention will be described in detail, with reference to the accompanying drawings. In such an embodiment, dimensions, materials, and other particular numerical values, etc., are merely exemplary to facilitate understanding of the invention and should not be construed as limiting the present invention thereto unless otherwise expressly described herein. Meanwhile, in this specification and the drawings, components having substantially the same function and configuration are denoted by the same reference numeral to omit repeated explanation, and components having no direct relation with the present invention are not illustrated.

(First Embodiment)

A radio communication terminal, such as a portable telephone, a PHS terminal, and the like, configures a broadband radio communication system together with a plurality of base stations, and performs communication with another radio communication terminal or a server on a communication network through the radio communication system. In the next-generation high-speed communication method such as WiMAX, in order to avoid reduction of a communication coverage, a relay station functioning as a base station is provided in a place where the radio wave state is poor due to densification of buildings, or a moving object, in which the radio wave state remarkably fluctuates, to act as a part of the radio communication system.

Herein, in order to facilitate understanding of the embodiment of the present invention, general configuration of a radio communication system as a whole including a relay station will be described, and then, detailed operation of each of apparatuses configuring the radio communication system will be described.

(Radio Communication System 100)

FIG. 1 is a block diagram showing general configuration of a radio communication system 100. The radio communication system 100 is configured by a radio communication terminal 110 (110A, 110B), a base station 120 (120A, 120B), a relay station 130, a communication network 140 including an ISDN (Integrated Services Digital Network) line, Internet, and a private line, and the like, and a relay server 150.

Herein, for the radio communication terminal 110, various electronic devices capable of performing radio communication, such as portable telephones, PHS terminals, note-type personal computers, PDAs (Personal Digital Assistant), digital cameras, music players, car navigators, portable televisions, game devices, DVD players, and remote controllers, may be used.

In the radio communication system 100 described above, when a user performs communication from his/her radio communication terminal 110A to another radio communication terminal 110B, the radio communication terminal 110A makes a radio connection request to the base station 120A, which lies within the communication coverage. Upon receiving the radio connection request, the base station 120A makes a request for communication connection to a communication counterpart to the relay server 150 through the communication network 140. In accordance with the request, the relay server 150 extracts the base station 120B, which lies within the radio communication coverage of the radio communication terminal 110B, by reference to position registration information of the radio communication terminal 110B, and thereby securing a communication path between the base station 120A and the base station 120B. In this manner, communication between the radio communication terminal 110A and the radio communication terminal 110B is performed (established).

If the user gets on a subway, which is an example of a moving object 170, the radio communication terminal 110A is changed to perform communication through the relay station 130, and not direct communication with the base station 120A. The relay station 130 is fixed in the moving object 170 to move together with the moving object 170, thereby extending the coverage even to the inside of the moving object. For the moving object 170, various vehicles, on which a person can take, such as cars, buses, subways (trains), vessels, and airplanes can be applied.

The radio communication terminal 110A of the user who is in the moving object and the relay station 130 move together with each other without changing the mutual position relation unless the user performs other acts such as looking for an unoccupied seat. Further, since there is no obstacle hiding them, it is possible to secure stable radio communication. Accordingly, regardless of movement of the moving object 170, the radio communication terminal 110A can stably keep communication with the radio communication terminal 110B through the relay station 130.

Hereinafter, the radio communication terminal 110, the base station 120, and the relay station 130, which configure the radio communication system 100, will be individually described.

(Radio Communication Terminal 110)

Figure 2:
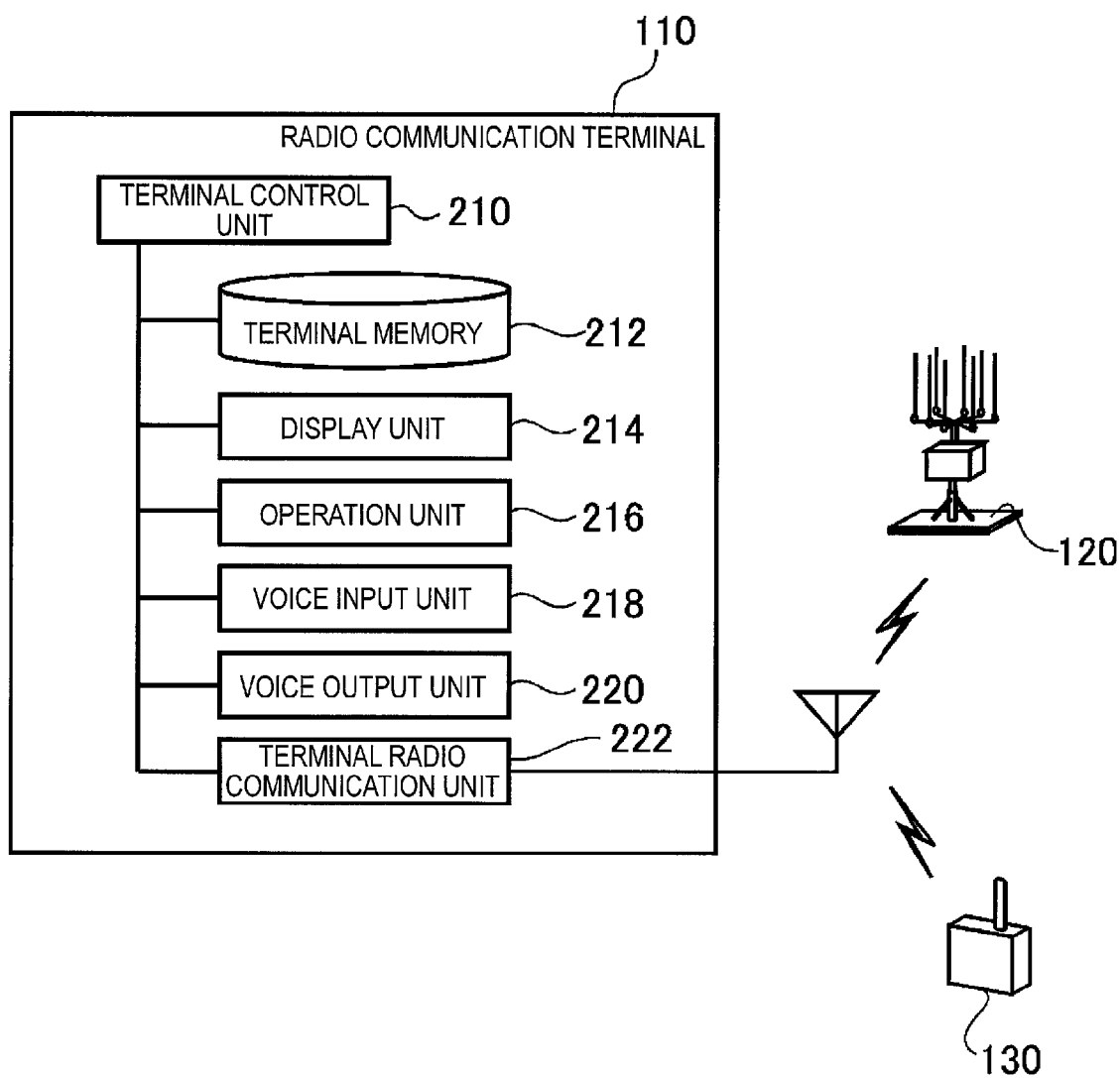
FIG. 2 is a functional block diagram showing hardware configuration of a radio communication terminal according to the first embodiment.
Figure 3:
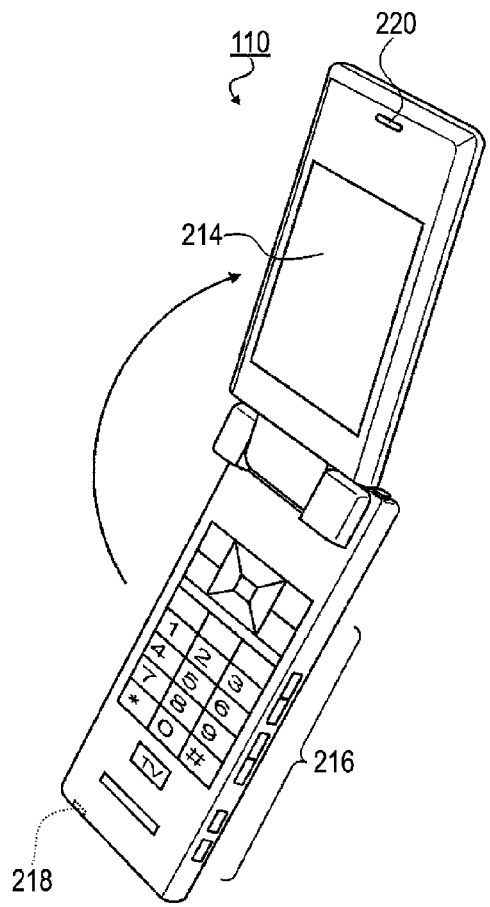
FIG. 3 is a perspective view showing the outer appearance of the radio communication terminal according to the first embodiment.

FIG. 2 is a functional block diagram showing hardware configuration of the radio communication terminal 110. FIG. 3 is a perspective view showing the outer appearance of the radio communication terminal 110. The radio communication terminal 110 is configured by a terminal control unit 210, a terminal memory 212, a display unit 214, an operation unit 216, a voice input unit 218, a voice output unit 220, and a terminal radio communication unit 222.

The terminal control unit 210 manages and controls the radio communication terminal 110 as a whole by means of a semiconductor integrated circuit including a central processing unit (CPU). The terminal control unit 210 also performs call function, mail transmitting and receiving function, imaging function, music playing function, and TV viewing function, by using programs of the terminal memory 212. The terminal memory 212 is configured by ROM, RAM, EEPROM, non-volatile RAM, flash memory, HDD, and so on, and stores programs processed in the terminal control unit 210, voice data, or others.

The display unit 214 is configured by a liquid crystal display, an EL (Electro Luminescence) display, and so on, and can display Web contents or GUI (Graphical User Interface) of application, stored in the terminal memory 212 or provided from an application relay server (not illustrated) through the communication network 140. The operation unit 216 is configured by switches such as a keyboard, a cross key, and a joystick, and accepts user's operation input.

The voice input unit 218 is configured by voice recognition means such as a microphone, and converts user's voice input during call into an electric signal, which can be processed in the radio communication terminal 110. The voice output unit 220 is configured by a speaker and converts call counterpart's voice signal received in the radio communication terminal 110 into voice to output it. The voice output unit 220 can output ringtones, operation sound of the operation unit 216, and alarm sound, etc. The terminal radio communication unit 222 performs radio communication with the base station 120 or the relay station 130 in the communication network 140. The terminal radio communication unit 222 may employ various radio communication systems such as the OFDM system including WiMAX, ARIB (Association and Radio Industries and Businesses) STD T95, and PHS MoU (Memorandum of Understanding), etc., the OFDMA system, and a TDMA (Time Division Multiple Access) system.

(Base Station 120)

Figure 4:
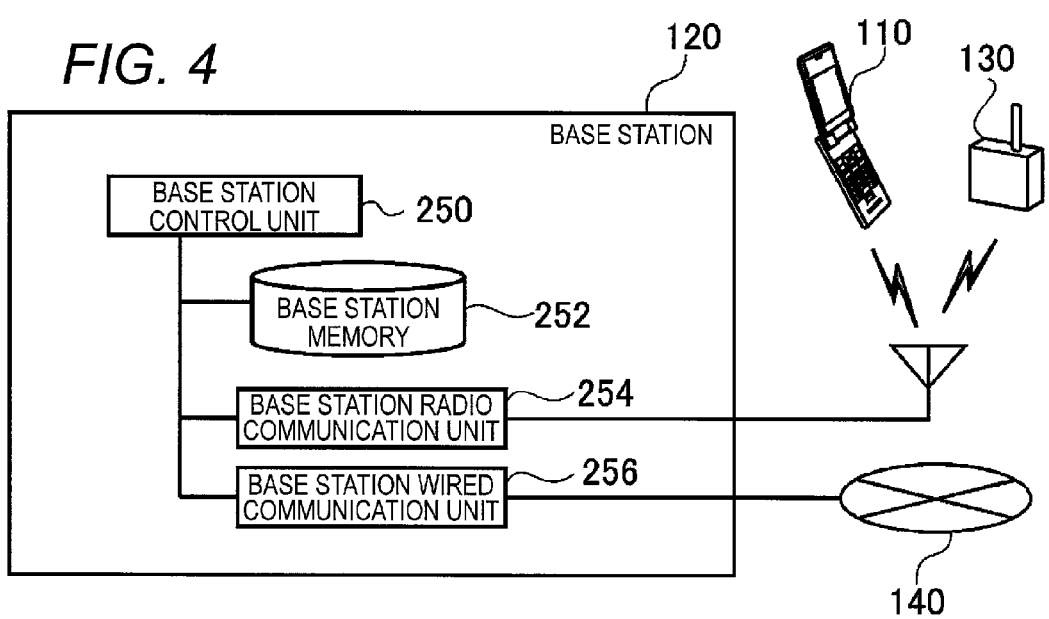
FIG. 4 is a block diagram showing general configuration of a base station according to the first embodiment.

FIG. 4 is a block diagram showing general configuration of the base station 120. The base station 120 is configured by a base station control unit 250, a base station memory 252, a base station radio communication unit 254, and a base station wired communication unit 256.

The base station control unit 250 manages and controls the base station 120 as a whole by means of a semiconductor integrated circuit including a central processing unit (CPU). The terminal memory 252 is configured by ROM, RAM, EEPROM, non-volatile RAM, flash memory, HDD, and so on, and stores programs processed in the base station control unit 250 or others.

The base station radio communication unit 254 performs radio communication with the radio communication terminal 110 or the relay station 130, for example, through the OFDMA system. The base station radio communication unit 254 may adaptively change QoS in accordance with the state of communication with the radio communication terminal 110 or the relay station 130 (adaptive modulation). The base station wired communication unit 256 can connect various servers including the relay server 150 through the communication network 140.

(Relay Station 130)

Figure 5:
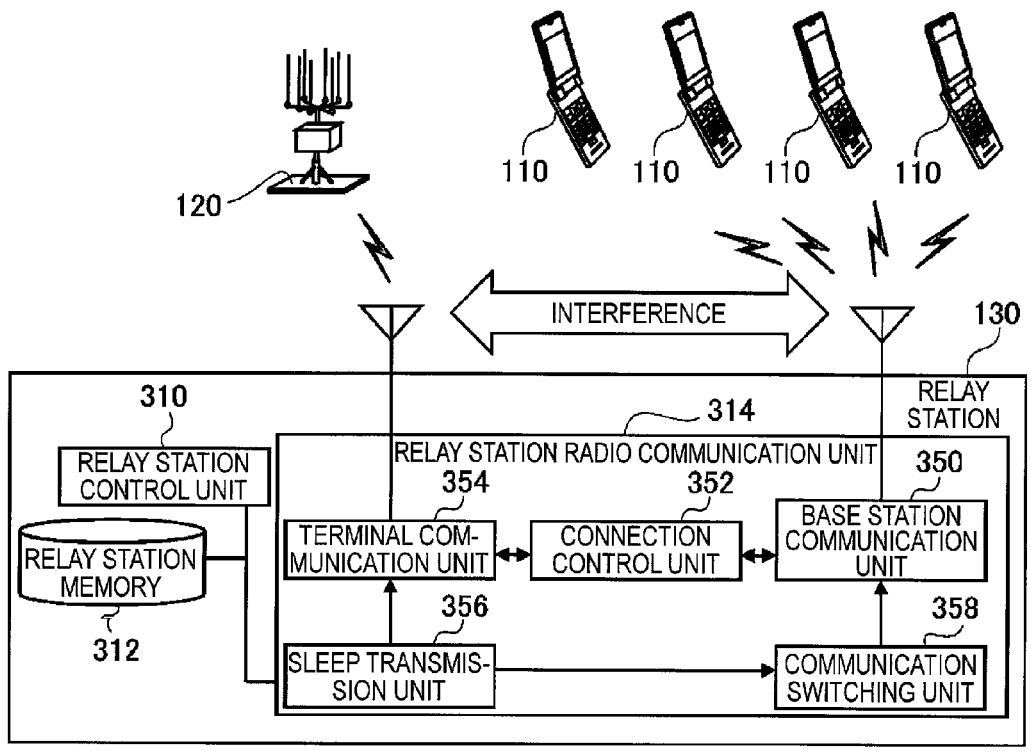
FIG. 5 is a block diagram showing general configuration of a relay station according to the first embodiment.

FIG. 5 is a block diagram showing general configuration of the relay station 130. The relay station 130 is configured by a relay station control unit 310, a relay station memory 312, and a relay station radio communication unit 314. The relay station 130 may be installed in the moving object 170, as well as a building or a tower.

The relay station control unit 310 manages and controls the relay station 130 as a whole by means of a semiconductor integrated circuit including a central processing unit (CPU). The relay station memory 312 is configured by ROM, RAM, EEPROM, non-volatile RAM, flash memory, HDD, and so on, and stores programs processed in the relay station control unit 310, or others. The relay station radio communication unit 314 performs radio communication with the radio communication terminal 110 and the base station 120, to relay the radio communication terminal 110 and the base station 120. The relay station radio communication unit 314 also functions as a base station communication unit 350, a connection control unit 352, a terminal communication unit 354, a sleep transmission unit 356 (one example of a command transmission unit), and a communication switching unit 358.

The base station communication unit 350 functions as the base station 120 for communication with the radio communication terminal 110, and acts as a physical layer (layer 1) and a data link layer (layer 2) in the OSI reference model. As shown in FIG. 5, basically, only one base station communication unit 350 is installed for one relay station. For application to a somewhat large space such as a vessel and an airplane, a plurality of base station communication units 350 may be configured. By virtue of the base station communication unit 350, even if the radio communication terminal 110 performs radio communication with the relay station 130 not the base station 120, the radio communication terminal 110 operates as if it is performing radio communication with the base station 120.

If a plurality of radio communication terminals 110 are connected to the base station communication unit 350, the connection control unit 352 performs control of channels (MAC tracer function). If the OFDMA system is adopted as in the first embodiment, the connection control unit 352 performs allocation of communication data to a channel map which is arranged with sub-channels, which are minimum transmission units of communication data, in time and frequency directions. The connection control unit 352 may adaptively change QoS, in accordance with the state of communication with the radio communication terminal 110, which is performing radio communication with the base station communication unit 350 (adaptive modulation).

The terminal communication unit 354 functions as the radio communication terminal 110 for communication with the base station 120, and acts as a physical layer and a data link layer in the OSI reference model. In the first embodiment, only one terminal communication unit 354 is provided based on the OFDMA system. However, the present invention is not limited to the embodiment. In the OFDMA system and other communication systems, it is possible to provide a plurality of terminal communication units 354. If a plurality of terminal communication units 354 are provided, each of the terminal communication units 354 can independently perform communication with a different base station 120.

Since the relay station 130 is housed in an integratedly formed housing, in most cases, the base station communication unit 350 and the terminal communication unit 354 described above are not spaced with a sufficient distance. Under this circumstance, if a frequency band used in communication with the base station 120 is close to a frequency band used in communication with the radio communication terminal 110, leakage power of transmission data in a transmitting side comes into a receiving side thereby causing interference with reception data. As a result, there is a possibility that the receiver cannot properly receive the reception data.

For example, in case of the OFDMA system such as WiMAX, ARIB STD T95, and PHS MoU, transmission power of the terminal communication unit 354 and the base station communication unit 350 is approximately 23 dBm at maximum, and adjacent leakage power thereof is approximately 4 to −4 dBm. An interference wave to the base station communication unit 350 when the terminal communication unit 354 transmits communication data to the base station 120, and an interference wave to the terminal communication unit 354 when communication data is transmitted from the base station communication unit 350 to the radio communication terminal 110 are approximately −10 to −20 dBm. On the other hand, reception power from the base station 120 or the radio communication terminal 110, which is originally desired by the terminal communication unit 354 or the base station communication unit 350, is approximately −40 to −80 dBm. Accordingly, it can be understood that since the power of the interference wave is higher than the reception power, there is a high possibility that the reception data will be affected by the interference wave. Such an interference wave causes deterioration of reception quality. The power values (dBm) described above are merely exemplary. There is no need to say that the first embodiment is not limited to the values.

Hereinafter, it is considered to avoid interference by intermittently performing radio communication between the base station 120 and the relay station 130, and performing communication between the relay station 130 and the radio communication terminal 110 while the base station 120 and the relay station 130 do not perform communication. However, performing the intermittent communication accompanies modifying of the base station 120 and the radio communication terminal 110, in addition to the relay station 130.

As described above, the relay station 130 is performing radio communication with the base station 120 as if it is the radio communication terminal 110. Therefore, the base station 120 cannot easily identify whether the radio communication terminal, which performs communication therewith, is the radio communication terminal 110 or the relay station 130 functioning as the radio communication terminal 110. Accordingly, if the base station 120 intermittently performs radio communication, the radio communication terminal 110, which does not originally require the intermittent communication, is compelled to perform the intermittent communication, thereby impeding effective utilization of resources. Further, even if the base station 120 could have identified the relay station 130 and the radio communication terminal 110, special processes are required, thereby causing increase of process load or costs.

If intermittent communication between the base station 120 and the relay station 130 or between the relay station 130 and the radio communication terminal 110 is independently performed, dropout of a control packet such as a data control packet occurs, thereby causing frequent retransmission of a packet. As a result, radio resources are unnecessarily consumed.

Accordingly, one object of the first embodiment is to avoid interference in a relay station thereby performing stable radio communication, in the manner that the relay station 130, specifically, a sleep transmission unit 356 or a communication switching unit 358, which will be described later, subjectively controls communication with the base station 120 and the radio communication terminal 110.

The sleep transmission unit 356, which is one example of a command transmission unit, transmits a sleep request command instructing the base station 120 to alternate communication and non-communication per a predetermined number of frames, to the base station 120 through the terminal communication unit 354. In general, the radio communication terminal 110 can causes the base station 120 to alternate communication and non-communication by the sleep request command. Accordingly, the terminal communication unit 354 functioning as the radio communication terminal 110 for transmission and reception of data can also causes alternation between communication and non-communication by the sleep request command.

Figure 6:
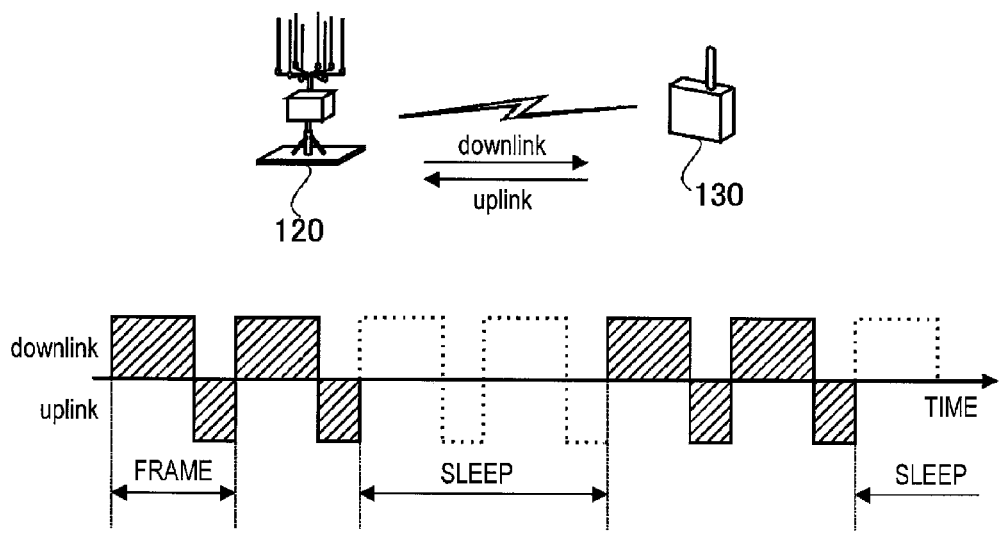
FIG. 6 is an explanation view to explain the state of communication between a base station and a relay station when sleeping is performed in the first embodiment.

FIG. 6 is an explanation view to explain the state of communication between the base station 120 and the relay station 130 when sleeping is performed. The sleep transmission unit 356 may allow the sleep request command to include how communication and non-communication can be alternated, as a parameter. Herein, an alternation unit can be designated by a frame unit. For example, FIG. 6 illustrates a case of two frames being designated. The reason for the designation of two frames is that the base station 120 requires a processing period equivalent to maximum two frames for the control command of the radio communication terminal 110. Although herein the alternation frame unit is two frames, the number of frames is not limited to this number, and may be any number not less than one. Communication and non-communication may be alternated per different number of frames. For example, communication may be in two frames, and non-communication may be in one frame.

As indicated by hatching in FIG. 6, the base station 120 performs communication with the terminal communication unit 354, and then sleeps a frame designated by the sleep request command, and during that time, the base station 120 does not perform allocation of a channel map for reception and transmission.

The communication switching unit 358 operates the base station communication unit 350, based on contents of an approval in response to the sleep request command, which the terminal communication unit 354 receives from the base station 120. Specifically, while the terminal communication unit 354 and the base station 120 are in non-communication (stopped), the communication switching unit 358 makes the base station communication unit 350 and the radio communication terminal 110 be in communication. While the terminal communication unit 354 and the base station 120 are in communication, the communication switching unit 358 makes the base station communication unit 350 and the radio communication terminal 110 be in non-communication. While communication with the radio communication terminal 110 is in a non-communication state, the connection control unit 352 does not perform allocation of a channel map for reception and transmission, to the radio communication terminal 110.

Figure 7:
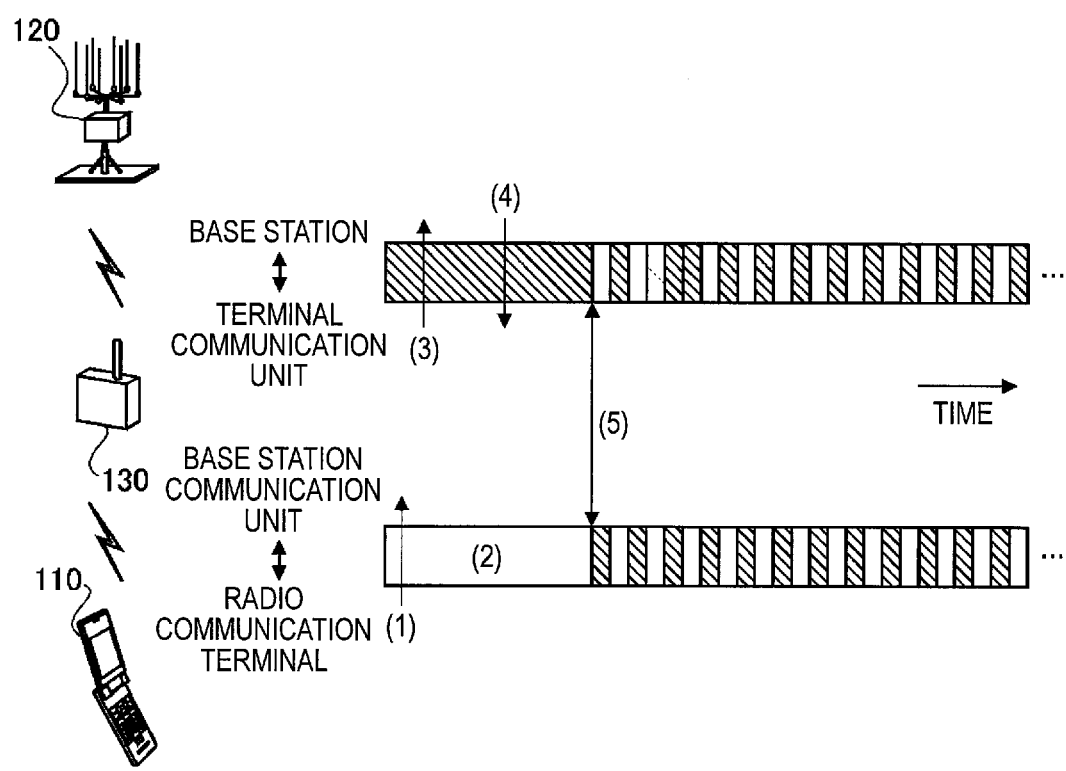
FIG. 7 is an explanation view to explain switching of communication between a base station and a terminal communication unit, and communication between a base station communication unit and a radio communication terminal in the first embodiment.

FIG. 7 is an explanation view to explain switching of communication between the base station 120 and the terminal communication unit 354, and between the base station communication unit 350 and the radio communication terminal 110.

At (1) when a communication request is received from the radio communication terminal 110, the base station communication unit 350 does not perform allocation of a channel map of the radio communication terminal 110, and keeps the non-communication state as shown in (2) of FIG. 7. When the sleep transmission unit 356 transmits a sleep request command including two frames, which is a sleep alternation cycle at (3), the base station 120 makes an approval response to the sleep request command at (4). The approval response includes whether to approve the sleep, a sleep schedule (how many frames are for communication, and how many frames are for sleep), and start timing in case of approval. If the base station 120 approves the sleep while changing the existing sleep schedule, the changed sleep schedule is presented.

When it comes to the start timing presented in the approval response from the base station 120 at (5), the base station 120 starts intermittent communication with the terminal communication unit 354. In accordance with a command of the communication switching unit 358, the base station communication unit 350 does not perform communication with the radio communication terminal 110 while the terminal communication unit 354 is communicating with the base station 120, and performs communication with the radio communication terminal 110 while communication between the terminal communication unit 354 and the base station 120 is stopped.

In the first embodiment, it is possible to request the base station 120 to intermittently stop (sleep) communication with the relay station 130, by using a sleep request command to alternate communication and non-communication per a predetermined number of frames. During this timing, communication with the base station 120 is disconnected, so that it is possible to stop RF of the terminal communication unit 354. And, communication between the relay station 130 and the radio communication terminal 110 is performed during the timing of the sleep. In this manner, the relay station 130 controls communication with the base station 120 or the radio communication terminal 110, so that it is possible to avoid interference in the relay station. Since the relay station 130 alternatively performs communication with the base station 120 and the radio communication terminal 110, synchronization with the base station 120 does not need to be displaced.

Further, since the sleep request command is an already existing command, it is possible to avoid interference in the relay station by using the sleep request command, without modifying the base station 120 or the radio communication terminal 110.

In the above, the base station communication unit 350 realizes non-communication with the radio communication terminal 110 by allowing the connection control unit 352 to not allocate communication data to a channel map.

Since the base station communication unit 350 can operate as the base station 120, it can freely change a channel map through the connection control unit 352. Accordingly, the base station communication unit 350 can realize the non-communication state by not allocating the communication data to each channel map, even without stopping (disconnection) of communication. In this manner, it is possible to easily realize intermittent communication between the base station communication unit 350 and the radio communication terminal 110, without modifying the radio communication terminal 110.

Since the relay station 130 consistently and subjectively performs intermittent communication, which is the characteristic of the present embodiment, it is possible to implement transmission and reception of a packet at a set timing. In addition, since existence of transmission and reception data can be reliably transmitted through channel mapping, dropout of a packet or occurrence of retransmission can be prevented, so that it is possible to perform stable radio communication.

(Radio Communication Relay Method)

Next, a radio communication relay method for performing radio communication by using the radio communication terminal 110, the base station 120, and the relay station 130 will be described in detail.

Figure 8:
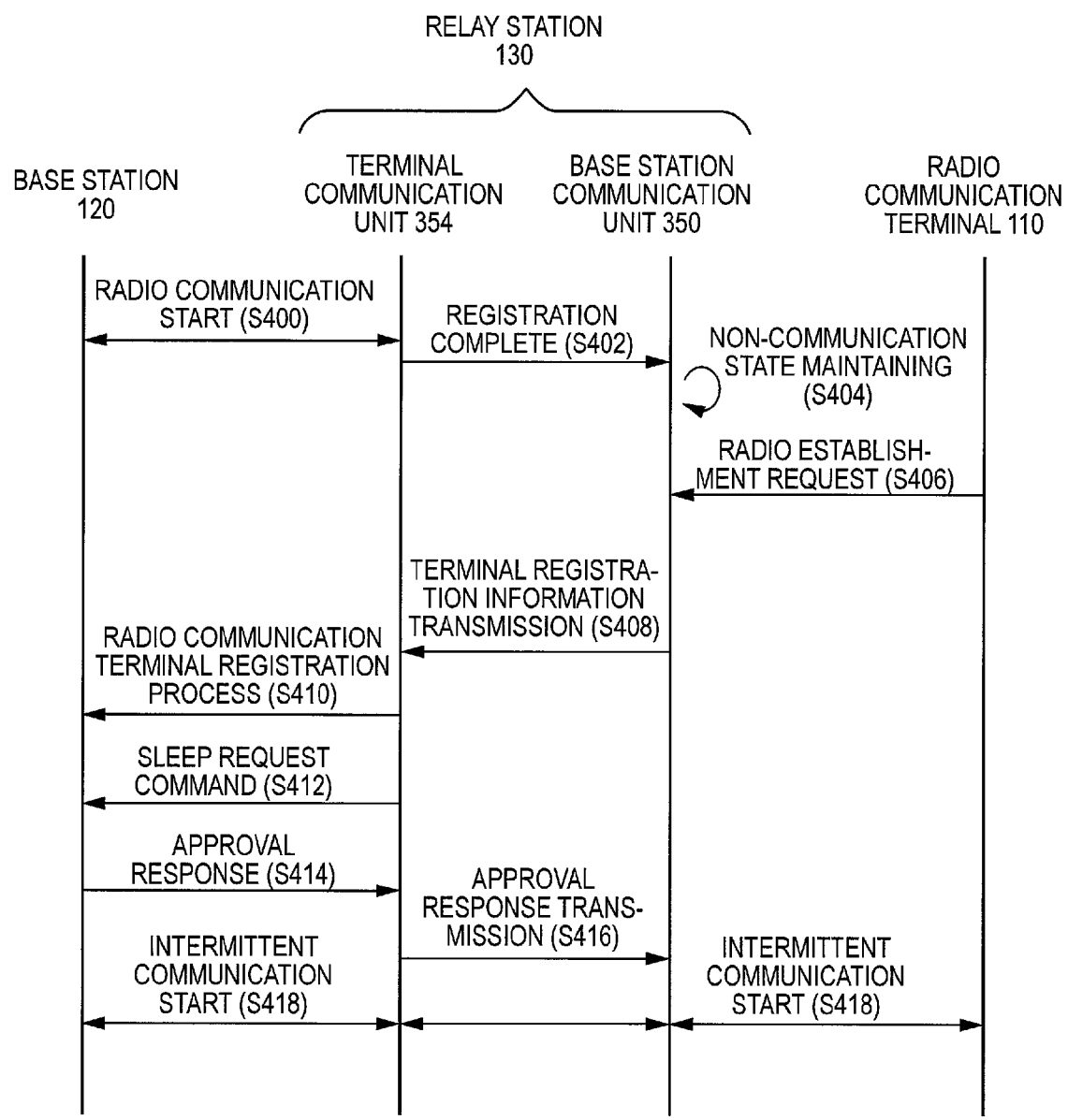
FIG. 8 is a sequence view showing detailed processes of a radio communication relay method according to the first embodiment.

FIG. 8 is a sequence view showing detailed processes of a radio communication relay method. First, the terminal communication unit 354 of the relay station 130 starts radio communication with the radio communication system 100 through the base station 120. The base station communication unit 350 registers itself with the radio communication system 100 to be recognized as the base station 120 (S400). The terminal communication unit 354 receives completion of the registration of the base station communication unit 350 (S402), and keeps the non-communication state (idle state), until the radio communication terminal 110 requesting communication connection to the base station communication unit appears (S404).

When a communication establishment request is made by the radio communication terminal 110 (S406), the base station communication unit 350 transmits terminal registration information acquired from the radio communication terminal 110 to the terminal communication unit 354 (S408). The terminal communication unit 354 implements processes for registration of the radio communication terminal 110, which has made the communication establishment request, by using the terminal registration information (S410). In this case, the base station communication unit 350 is still keeping the non-communication state by not allocating a channel map to the radio communication terminal 110.

Subsequently, the sleep transmission unit 356 transmits a sleep request command to the base station 120 through the terminal communication unit 354 (S412). In accordance with the sleep request command, the base station 120 makes an approval response to the terminal communication unit 354 (S414). The terminal communication unit 354 transmits a sleep schedule and start timing in the approval response, which are required for intermittent communication, to the base station communication unit 350 (S416). When it comes to the start timing, intermittent communication between the base station 120 and the terminal communication unit 354, and between the base station communication unit 350 and the radio communication terminal 110 is started (S418).

In the intermittent communication, a communication speed is expected to be halved. However, in order to secure a predetermined communication amount, the base station 120 performs special multiplexing, thereby extending a communication band allocated to the radio communication terminal 110.

In the radio communication relay method, the relay station 130 controls communication with the base station 120 or the radio communication terminal 110, thereby avoiding interference in the relay station, so that it is possible to perform stable radio communication.

Since the sleep request command is an already existing command, it is possible to avoid interference in the relay station by using the sleep request command, without modifying the base station 120 and the radio communication terminal 110.

(Second Embodiment)

In the first embodiment, intermittent communication is realized through an already existing sleep request command. However, means for realizing intermittent communication performed by the relay station 130 is not limited to the sleep request command. For example, intermittent communication can be realized by a scan request command. In the second embodiment, intermittent communication using the scan request command will be described.

Figure 9:
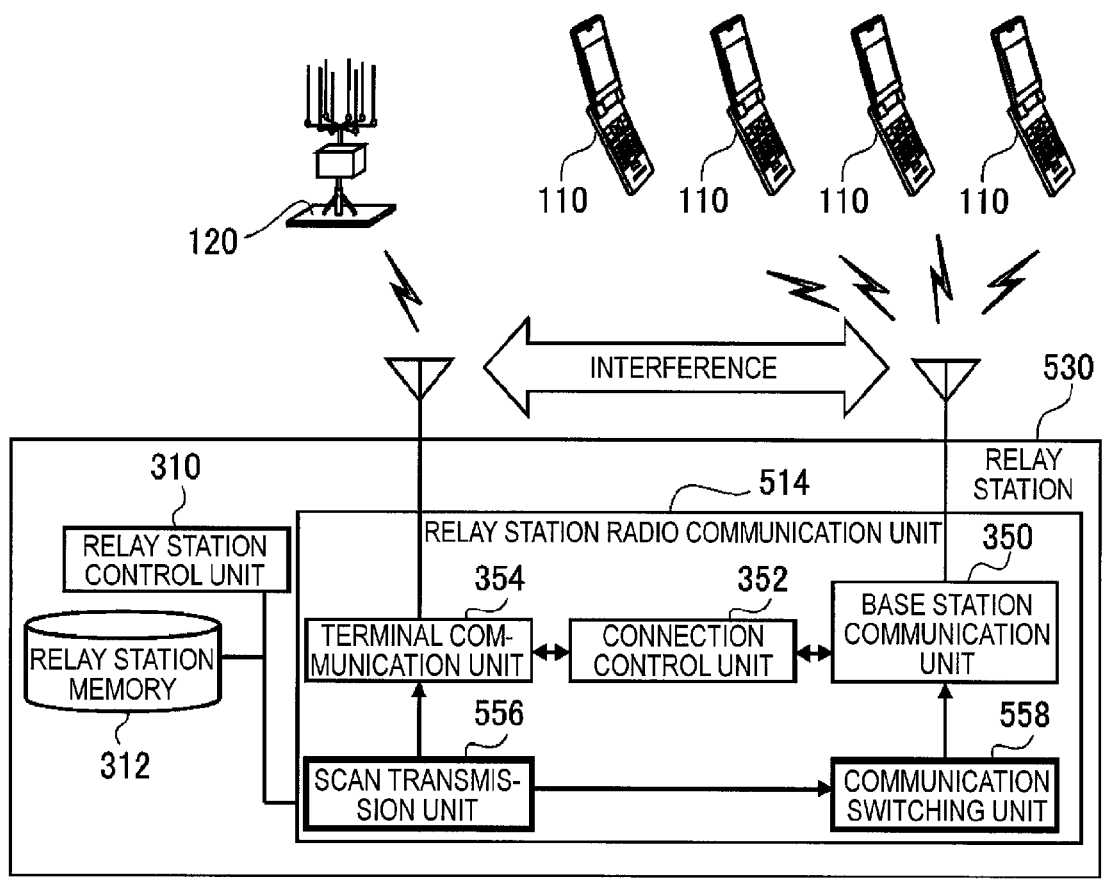
FIG. 9 is a block diagram showing general configuration of a relay station according to a second embodiment.

FIG. 9 is a block diagram showing general configuration of the relay station 530 in the second embodiment. The relay station 530 is configured by a relay station control unit 310, a relay station memory 312, and a relay station radio communication unit 514. The relay station radio communication unit 514 functions as the base station communication unit 350, the connection control unit 352, the terminal communication unit 354, a scan transmission unit 556, and a communication switching unit 558. The relay station control unit 310, the relay station memory 312, the base station communication unit 350, the connection control unit 352, and the terminal communication unit 354 have been described as the components of the first embodiment and have substantially the same functions as described in the first embodiment. Thus, repeated explanation of the components will be omitted. Herein, the different components, i.e., the scan transmission unit 556 (one example of the command transmission unit) and the communication switching unit 558, will be primarily described.

The scan transmission unit 556, which is one example of the command transmission unit, transmits a scan request command instructing the base station 120 to alternate communication and adjacent cell scanning per a predetermined number frames, to the base station 120 through the terminal communication unit 354.

Figure 10:
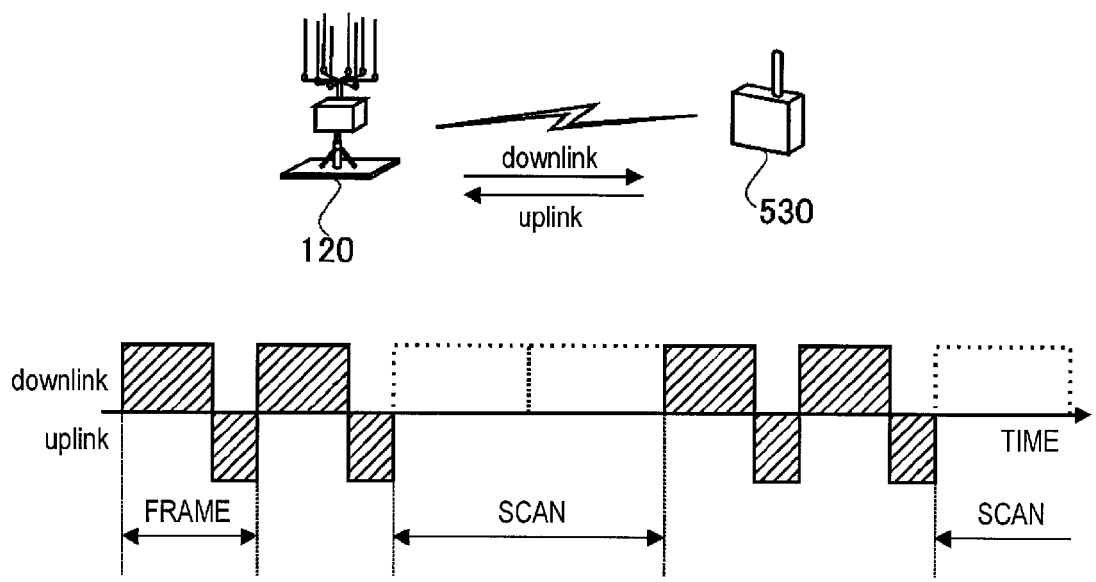
FIG. 10 is an explanation view to explain the state of communication between a base station and a relay station when scanning of adjacent cells is performed in the second embodiment.

FIG. 10 is an explanation view to explain the state of communication between the base station 120 and the relay station 530 when scanning of an adjacent cell is performed. The scan transmission unit 556 may allow the scan request command to include how the scanning is repeated, as a parameter. Herein, a repeat unit can be designated by a frame unit. For example, FIG. 10 illustrates designation to perform scanning of two frames in a cycle of four frames. In this case, communication and scanning may be repeated per different number of frames. For example, communication may be in two frames, and scanning may be in one frame.

As presented by hatching in FIG. 10, the base station 120 performs communication with the terminal communication unit 354. The base station 120 also performs scanning of an adjacent cell in a frame designated by the scan request command. During execution of the adjacent cell scanning, the base station 120 does not perform allocation of a channel map for reception and transmission with the relay station 530. In other words, during performing the adjacent cell scanning, the base station 120 and the relay station 530 are in non-communication.

The scan transmission unit 556 may transmit the scan request command every predetermined time. Unlike the sleep request command in the first embodiment, by the scan request command, when the predetermined time (for example, several seconds) elapses, scanning is automatically stopped, and is returned to a normal state for performing communication in all frames. In the second embodiment, the relay station 530 estimates time when cell scanning is finished and repeatedly transmits the scan request command to the base station every predetermined time to enable the base station 120 to keep intermittent communication. As a result, it is possible to avoid interference and continuously perform stable radio communication.

The communication switching unit 558 operates the base station communication unit 350 based on the scan request command if the base station 120 approves the scan request command. Specifically, while the terminal communication unit 354 and the base station 120 are in non-communication, the communication switching unit 358 makes the base station communication unit 350 and the radio communication terminal 110 be in communication. While the terminal communication unit 354 and the base station 120 are in communication, the communication switching unit 358 makes the base station communication unit 350 and the radio communication terminal 110 be in non-communication.

Figure 11:
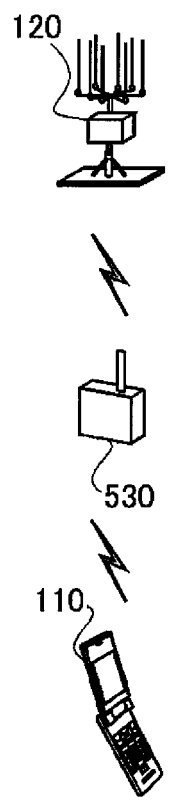
FIG. 11 is an explanation view to explain switching of communication between a base station and a terminal communication unit, and communication between a base station communication unit and a radio communication terminal in the second embodiment.
Figure 11:
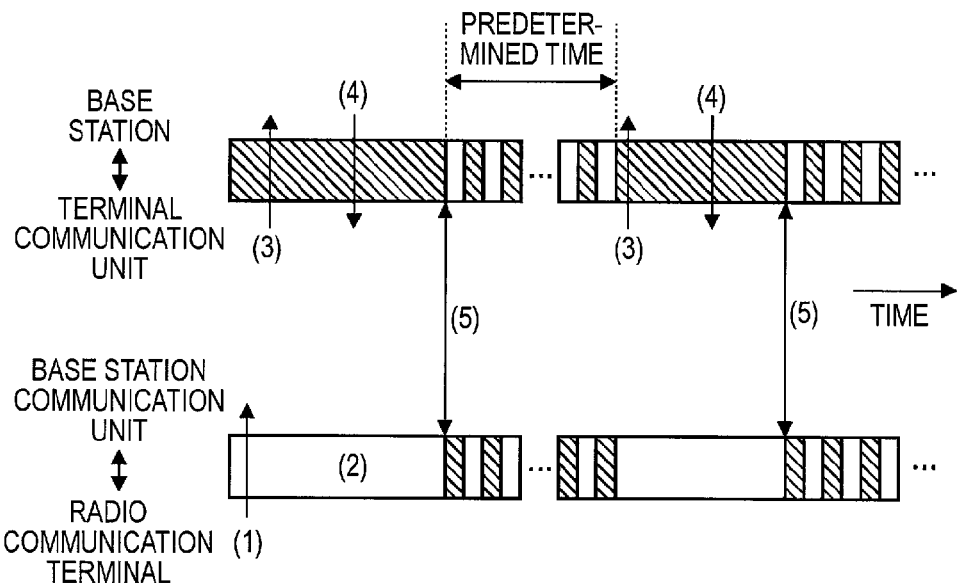

FIG. 11 is an explanation view to explain switching of communication between the base station 120 and the terminal communication unit 354, and between the base station communication unit 350 and the radio communication terminal 110.

At (1) when a communication request is received from the radio communication terminal 110, the base station communication unit 350 does not perform allocation of a channel map of the radio communication terminal 110, and keeps the non-communication state as shown in (2) of FIG. 11. When the scan transmission unit 556 transmits a scan request command at (3), the base station 120 makes an approval response to the scan request command at (4). The approval response includes whether to approve performing of scanning, a scan schedule (how many frames are for communication, and how many frames are for scanning), and start timing in case of approval.

When it comes to the start timing displayed in the approval response from the base station 120 at (5), the base station 120 starts intermittent communication with the terminal communication unit 354 by scanning an adjacent cell. In accordance with a command of the communication switching unit 558, the base station communication unit 350 does not perform communication with the radio communication terminal 110 while the terminal communication unit 354 is communicating with the base station 120, and performs communication with the radio communication terminal 110 while communication between the terminal communication unit 354 and the base station 120 is stopped.

As described above, by the scan request command, if a predetermined time (for example, several seconds) elapses, scanning (intermittent communication) is automatically finished, and returned to the normal state. Accordingly, the scan transmission unit 556 estimates time when adjacent cell scanning is finished, and repeatedly transmits the scan request command every predetermined time at (3), (4), and (5) to keep intermittent communication.

In the second embodiment, instead of the sleep request command, by using the scan request command to alternate communication and adjacent cell scanning per a predetermined number of frames, it is possible to intermittently scan an adjacent cell to the base station 120. Since the base station 120 first stops communication during scanning of an adjacent cell, communication between the relay station 530 and the radio communication terminal 110 is performed at the timing of the scanning. In this manner, like the sleep request command, the relay station 530 controls communication with the base station or the radio communication terminal, so that it is possible to avoid interference in the relay station.

Since the scan request command is an already existing command, it is possible to avoid interference in the relay station by using the scan request command, without modifying the base station 120 or the radio communication terminal 110.

(Radio Communication Relay Method)

Next, a radio communication relay method for performing radio communication by using the radio communication terminal 110, the base station 120, and the relay station 130 will be described in detail.

FIG. 12 is a sequence view showing detailed processes of a radio communication relay method according to the second embodiment. The processes (S400 to 5410) of the first embodiment that have been described with reference to FIG. 8 are substantially the same as those in the second embodiment. Thus, by denoting the same reference numerals as used in the first embodiment, repeated explanation of the processes will be omitted.

The terminal communication unit 354 performs processes for registration of the radio communication terminal 110, which has made a communication establishment request, by using terminal registration information (S410). The base station communication unit 350 is keeping the non-communication state, by not allocating a channel map to the radio communication terminal 110.

After the terminal communication unit 354 performs processes for registration of the radio communication terminal 110, which has made a communication establishment request, by using terminal registration information (S410), the scan transmission unit 556 transmits the scan request command to the base station 120 through the terminal communication unit 354 (S600). In accordance with the scan request command, the base station 120 makes an approval response to the terminal communication unit 354 (S414). In this manner, when it comes to the start timing, intermittent communication between the base station 120 and the terminal communication unit 354, and between the base station communication unit 350 and the radio communication terminal 110 is started (S418).

However, by the scan request command, intermittent communication is automatically finished after a predetermined time (S602). Accordingly, the scan transmission unit 556 periodically makes the scan request command (S604), thereby keeping intermittent communication.

In such a radio communication relay method, the relay station 130 controls communication with the base station 120 or the radio communication terminal 110, thereby avoiding interference in the relay station, so that it is possible to perform stable radio communication.

Since the scan request command is an already existing command, it is possible to avoid interference in the relay station by using the scan request command, without modifying the base station 120 or the radio communication terminal 110.

Preferred embodiments of the present invention have been described with reference to the accompanying drawings. However, there is no need to say that the present invention is not limited to the embodiment. One of ordinary skill in the art can make various modified and altered embodiments within the scope described in the claims. The modified and altered embodiments are construed as being within the technical scope of the present invention.

For example, although the embodiments that have been described use the sleep request command or the scan request command, any command can be used if it is capable of controlling the base station 120 to alternate communication and non-communication per a predetermined number of frames. Such a command may not be an already existing command.

The steps in the radio communication relay method described in this specification do not need to be sequentially performed in the order described in the sequence views and may be performed in parallel or by subroutine.

The present invention provides the following embodiments:

(1) A relay station capable of relaying radio communication between a radio communication terminal and a base station, the relay station comprising: a base station communication unit which performs radio communication with one or more radio communication terminals; a terminal communication unit which performs radio communication with the base station; a command transmission unit which transmits a command to the base station though the terminal communication unit, the command instructing the base station to alternate communication and non-communication per a predetermined number of frames; and a communication switching unit which makes the base station communication unit and the radio communication terminal be in communication while the terminal communication unit and the base station are in non-communication based on the command, and makes the base station communication unit and the radio communication terminal be in non-communication while the terminal communication unit and the base station are in communication based on the command.

According to this configuration, the relay station requests the base station to make communication with the relay station in intermittent non-communication. And, communication between the relay station and the radio communication terminal is performed during the non-communication timing. In this manner, the relay station controls communication with the base station or the radio communication terminal, so that it is possible to avoid interference in the relay station. The relay station constantly performs the intermittent communication, thereby preventing dropout of a packet or occurrence of retransmission. As a result, it is possible to perform stable radio communication.

(2) In the relay station of (1), the command transmission unit transmits, as the command, a sleep request command instructing the base station to alternate communication and non-communication per the predetermined number of frames, to the base station.

According to this configuration, since the sleep request command is an already existing command, it is possible to avoid interference in the relay station, without modifying the base station or the radio communication terminal.

(3) In the relay station of (1), the command transmission unit transmits, as the command, a scan request command instructing the base station to alternate communication and adjacent cell scanning per the predetermined number of frames, to the base station.

According to this configuration, like the sleep request command, since the scan request command is an already existing command, it is possible to avoid interference in the relay station, without modifying the base station or the radio communication terminal.

(4) In the relay station of (3), the command transmission unit transmits the scan request command every predetermined time.

Unlike the sleep request command described above, by the scan request command, scanning is automatically stopped if predetermined time elapses, and is returned to a normal state for performing communication in all frames. According to the configuration of (4), it is possible to estimate time when cell scanning is finished and repeatedly transmit the scan request command every predetermined time, thereby avoiding interference, so that it is possible to continuously perform stable radio communication.

(5) In the relay station according to (1) to (4), the base station communication unit realizes non-communication by not allocating communication data to a channel map in an OFDMA system.

According to this configuration, since the base station communication unit can operate as a base station, it can freely change a channel map of the OFDMA system. Accordingly, it is possible to realize the non-communication state by not allocating the communication data to each channel map, without stopping of communication. In this manner, it is possible to easily realize intermittent communication between the base station communication unit and the radio communication terminal, without modifying the radio communication terminal.

(6) A radio communication relay method for relaying radio communication between a radio communication terminal and a base station, the method comprising: performing radio communication with one or more radio communication terminals; performing radio communication with the base station; transmitting a command to the base station, the command instructing the base station to alternate communication and non-communication per a predetermined number of frames; and making the base station communication unit and the radio communication terminal be in communication while the terminal communication unit and the base station are in non-communication based on the command, and making the base station communication unit and the radio communication terminal be in non-communication while the terminal communication unit and the base station are in communication based on the command.

(7) In the radio communication relay method of (6), the command is a sleep request command instructing to alternate communication and non-communication per the predetermined number of frames.

(8) In the radio communication relay method of (6), the command is a scan request command instructing to alternate communication and adjacent cell scanning per the predetermined number of frames.

The present invention is based on a Japanese Patent Application No. 2008-214723, filed on Aug. 23, 2008, the disclosure of which is herein incorporated by reference.

INDUSTRIAL APPLICABILITY

The present invention can be used for a relay station capable of relaying radio communication between a radio communication terminal and a base station, and a radio communication relay method.

DESCRIPTION OF REFERENCE NUMERALS

110 . . . radio communication terminal
120 . . . base station
130, 530 . . . relay station
350 . . . base station communication unit
352 . . . connection control unit
354 . . . terminal communication unit
356 . . . sleep transmission unit (command transmission unit)
358, 558 . . . communication switching unit
556 . . . scan transmission unit (command transmission unit)

The invention claimed is:

1. A relay station capable of relaying radio communication between a radio communication terminal and a base station, the relay station comprising:
   a base station communication unit which performs radio communication with one or more radio communication terminals;
   a terminal communication unit which performs radio communication with the base station;
   a command transmission unit which transmits a command to the base station though the terminal communication unit, the command instructing the base station to alternate communication and non-communication per a predetermined number of frames; and
   a communication switching unit which makes the base station communication unit and the radio communication terminal be in communication while the terminal communication unit and the base station are in non-communication based on the command, and makes the base station communication unit and the radio communication terminal be in non-communication while the terminal communication unit and the base station are in communication based on the command,
   wherein the command transmission unit transmits, as the command, a sleep request command instructing the base station to alternate communication and non-communication per the predetermined number of frames, to the base station.

2. The relay station according to claim 1,
   wherein the base station communication unit realizes non-communication by not allocating communication data to a channel map in an OFDMA system.

3. A radio communication relay method for relaying radio communication between a radio communication terminal and a base station, the method comprising:
   performing radio communication with one or more radio communication terminals by a base station communication unit;
   performing radio communication with the base station by a terminal communication unit;
   transmitting a command to the base station, the command instructing the base station to alternate communication and non-communication per a predetermined number of frames; and
   making the base station communication unit and the radio communication terminal be in communication while the terminal communication unit and the base station are in non-communication based on the command, and making the base station communication unit and the radio communication terminal be in non-communication while the terminal communication unit and the base station are in communication based on the command,
   wherein the command transmitted to the base station is a sleep request command instructing the base station to alternate communication and non-communication per the predetermined number of frames.

* * * * *